United States Patent
Plocher et al.

(10) Patent No.: US 7,728,853 B2
(45) Date of Patent: *Jun. 1, 2010

(54) SYSTEMS AND METHODS FOR CHANGING VIEW PERSPECTIVE IN 3-D GRAPHICAL DISPLAYS OF BUILDINGS WITH STEPPED ROTATION

(75) Inventors: Thomas A. Plocher, Hugo, MN (US); Jeffrey M. Rye, Roseville, MN (US)

(73) Assignee: Honeywell International Inc., Morristown, NJ (US)

( * ) Notice: Subject to any disclaimer, the term of this patent is extended or adjusted under 35 U.S.C. 154(b) by 651 days.

This patent is subject to a terminal disclaimer.

(21) Appl. No.: 11/430,532

(22) Filed: May 9, 2006

(65) Prior Publication Data

US 2007/0107371 A1    May 17, 2007

Related U.S. Application Data

(63) Continuation-in-part of application No. 11/274,443, filed on Nov. 15, 2005.

(51) Int. Cl.
*G09G 5/34* (2006.01)
(52) U.S. Cl. .................................... 345/649
(58) Field of Classification Search ................. 345/649
See application file for complete search history.

(56) References Cited

U.S. PATENT DOCUMENTS

| | | | |
|---|---|---|---|
| 5,297,252 A | 3/1994 | Becker | |
| 5,920,862 A * | 7/1999 | Waters | 707/10 |
| 6,052,648 A * | 4/2000 | Burfeind et al. | 702/3 |
| 6,437,798 B1 | 8/2002 | Aoki | |
| 6,731,304 B2 * | 5/2004 | Sowizral et al. | 345/622 |
| 6,983,283 B2 * | 1/2006 | Sowizral et al. | 707/102 |
| 7,106,328 B2 * | 9/2006 | Royan | 345/428 |
| 7,130,775 B2 * | 10/2006 | Takagaki et al. | 703/1 |
| 7,212,202 B2 * | 5/2007 | Weaver | 345/420 |
| 2004/0002380 A1 * | 1/2004 | Brosnan et al. | 463/32 |
| 2004/0145614 A1 * | 7/2004 | Takagaki et al. | 345/964 |
| 2004/0236543 A1 * | 11/2004 | Stephens | 703/1 |
| 2005/0002662 A1 * | 1/2005 | Arpa et al. | 396/120 |
| 2005/0128212 A1 * | 6/2005 | Edecker et al. | 345/582 |
| 2005/0252984 A1 | 11/2005 | Ahmed | |
| 2006/0228019 A1 * | 10/2006 | Rahmes et al. | 382/154 |

(Continued)

OTHER PUBLICATIONS

Visualizing simulated room fires (case study) Jayesh Govindarajan, Matthew Ward, Jonathan Barnett Oct. 1999 VIS '99: Proceedings of the conference on Visualization '99: celebrating ten years Publisher: IEEE Computer Society Press.*

(Continued)

*Primary Examiner*—Javid A Amini
(74) *Attorney, Agent, or Firm*—Husch Blackwell Sanders Welsh & Katz

(57) ABSTRACT

A method and system of rendering buildings in three-dimensional space first renders a respective floor, then adds objects and finally walls to bound each of the floors. The result, a three-dimensional rendering of a building illustrates the position of objects within the building in addition to presenting the overall shape of the building. The rendering can be discontinuously rotated, about an axis, in response to user inputs.

38 Claims, 13 Drawing Sheets

U.S. PATENT DOCUMENTS

2007/0107371 A1* 5/2007 Plocher et al. ........... 52/745.05

OTHER PUBLICATIONS

Kjeld Schmidt, title of : Field studies I: Ordering systems: coordinative practices in architectural design and planning, Nov. 2003.*

Jürgen Döllner, Henrik Buchholz, title of : Virtual reality and 3D: Continuous level-of-detail modeling of buildings in 3D city models, Nov. 2005.*

Procedural modeling of cities Yoav I. H. Parish, Pascal Müller Aug. 2001 SIGGRAPH '01: Proceedings of the 28th annual conference on Computer graphics and interactive techniques.*

Extended European Search Report corresponding to European Patent Application No. 07251872.3, dated Sep. 18, 2007.

* cited by examiner

SYSTEMS AND METHODS FOR CHANGING VIEW PERSPECTIVE IN 3-D GRAPHICAL DISPLAYS OF BUILDINGS WITH STEPPED ROTATION

CROSS-REFERENCE TO RELATED APPLICATION

This is a continuation-in-part of U.S. patent application Ser. No. 11/274,443 filed Nov. 15, 2005, entitled "SYSTEMS AND METHODS FOR RENDERING BUILDING SPACES" which is incorporated by reference herein.

FIELD

The invention pertains to the creation and presentation of three-dimensional images on two-dimensional graphical displays. More particularly, the invention pertains to systems and methods for generating three-dimensional renderings of building spaces and rotating same with stepped rotation on two-dimensional graphical display devices.

BACKGROUND

Known software and hardware is available for rendering various types of three-dimensional images including building spaces. Known methods and systems at times do not clearly or accurately depict the location of objects in a rendered image of a building. Further, at times the positional relationships of objects to one another, when the objects are located on multiple floors, are not always clearly depicted.

Known systems include the use of graphics hardware to attempt to generate accurate three-dimensional images. Other known methods seek to improve accuracy by rendering the back walls first. The objects in the floors are then drawn. Finally, the front walls are rendered. Such processes can suffer from performance penalties other drawbacks. Some systems use animation software to implement rotations of the displayed spaces.

Known systems and methods often do not accurately render transparency and depth simultaneously in a three-dimensional structure unless the polygons used to create the images are rendered from back to front. However, in such processes, sorting of polygons can be either inefficient or unfeasible due to time and depth processing requirements. Thus, errors can arise from currently used techniques for transparency which ignore depth or techniques for testing depth which ignore transparency.

Increasingly, 3D models of large buildings are being used in graphical displays to support situation awareness in a variety of domains including firefighting, building security, asset tracking and HVAC management. For example, a semi-transparent 3D model of a building can be used to provide a birds-eye perspective view of the building, outside looking in, and the locations of activated smoke and heat detectors in three-dimensional space. From such a display, the firefighter can comprehend the spread of the fire at a glace, particularly the vertical spread between floors of the building. Also, it is a very intuitive way for the firefighter to visualize a path to the fire and to view the locations of his or her team members.

One of the advantages of 3D graphics for buildings is the possibility created for the user to view the building, outside looking in, from different perspectives. Rotating the building on its axis around a 360 degree radius reveals new and valuable relationships between objects embedded in the building and features such as doors, elevators, water sources, etc. However, as noted above, continued rotation of the building in graphics requires animation and is computationally demanding.

Rotation also can give rise to problems of user spatial disorientation ("What side of the building am I looking at now? How do I get back to the front door or lobby side?") A method clearly is needed that will provide some of the advantages of perspective change created by 360 degree rotation while keeping the computational load to a minimum and providing orientation anchors for the user.

There thus continues to be an ongoing need for systems and methods for rendering and rotating multi-dimensional building spaces without requiring animation software. Additionally, it would be desirable to be able to provide orientation indicators for the user so as to minimize partial disorientation. Finally, it will be preferable to be able to continue to accurately locate objects on the respective floor or floors as well as accurately render transparency and depth simultaneously without having to sort polygons.

DETAILED DESCRIPTION

Figure 1:
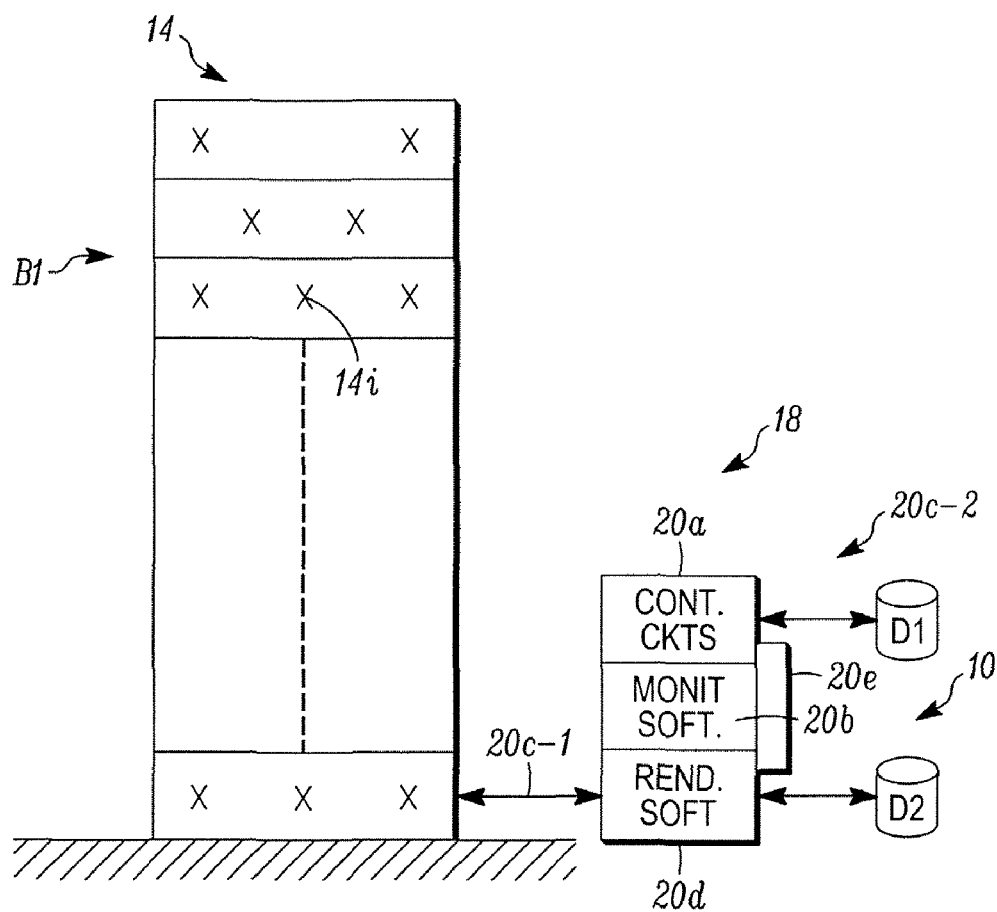
FIG. 1 is block diagram of a system in accordance with the invention.

While this invention is susceptible of embodiment in many different forms, there are shown in the drawing and will be described herein in detail specific embodiments thereof with the understanding that the present disclosure is to be considered as an exemplification of the principles of the invention and is not intended to limit the invention to the specific embodiments illustrated.

A method in accordance with the invention, as described below, provides stepped rather than continuous rotation of an image of a building about its axis. The present method and system are advantageous in that eliminating the need for continuous animation in connection with the rotation substantially reduces computational demands. Additionally, indicia are provided to maintain user orientation.

In one aspect of the invention, a user can rotate an image of a building about its axis in fixed steps on the order of 30 degrees or 60 degrees to the right or left. The intermittent or stepped rotation is carried out by means of a plurality of command buttons presented on the same display as image of the building is being presented on. For example, a complete trip around the exterior periphery of a building, looking into a selected floor thereof, can be carried out in six steps using a sixty degree rotation button. Alternately, it can be carried in twelve steps using a 30 degree rotation button.

Orientation of the operator or user is reinforced or supported by the availability of a "front" button which immediately rotates the image such that the user use the image from a front or forward orientation.

In another aspect of the invention, the user or operator can switch between two dimensional floor plan views or three dimensional perspective-type views illustrating multiple floors. When switching back and forth between two dimensional views or three dimensional views, orientation is reinforced or supported since the new view has the same orientation as the prior view.

FIG. 1 illustrates a system 10 which might be distributed throughout a plurality of floors of a building B1 for purposes of monitoring various conditions throughout the building. Representative conditions could include fire, smoke, gas, operation of a HVAC systems, illumination systems, and/or security systems all without limitation.

System 10 could incorporate a plurality of ambient condition detectors scattered throughout the building indicated generally at 14 for purposes of monitoring various conditions throughout the building of B1. Signals that pertain to outputs from detectors 14 could be coupled to a fire situation control and display unit 18. The unit 18 could be in wired or wireless communication with various of the detectors 14 scattered throughout the building B1.

Information pertaining to conditions within the building B1 could be presented one or more local visual displays. Such displays could provide information pertaining to the state of one or more of the members 14i of the plurality 14 of ambient condition detectors.

Unit 18 can be implemented with control circuits 20a which could include one or more programmable processors. It will be understood that the processors need not all be located physically near one another. They could communicate via one or more networks.

Unit 18 can also include control and monitoring software 20b executable by one or more of the processors of control circuits 20a. The software 20b implements communications with the plurality of ambient condition detectors 14, as well as other displaced devices via a wired and/or wireless medium indicated generally at 20c-1. Communications can be provided to other sites via a wired or wireless medium 20c-2.

The unit 18 can also include software 20d, discussed in more detail subsequently, for presenting one or more renderings of the building B1. The renderings in 2D or 3D form, can be presented locally on a two-dimensional visual display unit 20e. The unit 20c can be viewed by first responders in the vicinity for purposes of understanding the layout of the building B1, including location of stairways and elevators in the building, location and arrangement of the members of the plurality of detectors 14. Those detectors which are emitting indications of an alarm condition can be highlighted.

As those of skill in the art will understand, a variety of software is available to create renderings of the various floors of the building B1. A preferred system and process are disclosed and claimed in the parent hereto, U.S. patent application Ser. No. 11/274,443 incorporated by reference herein. Other forms of rendering come within the spirit and scope of the invention.

Figure 2A:
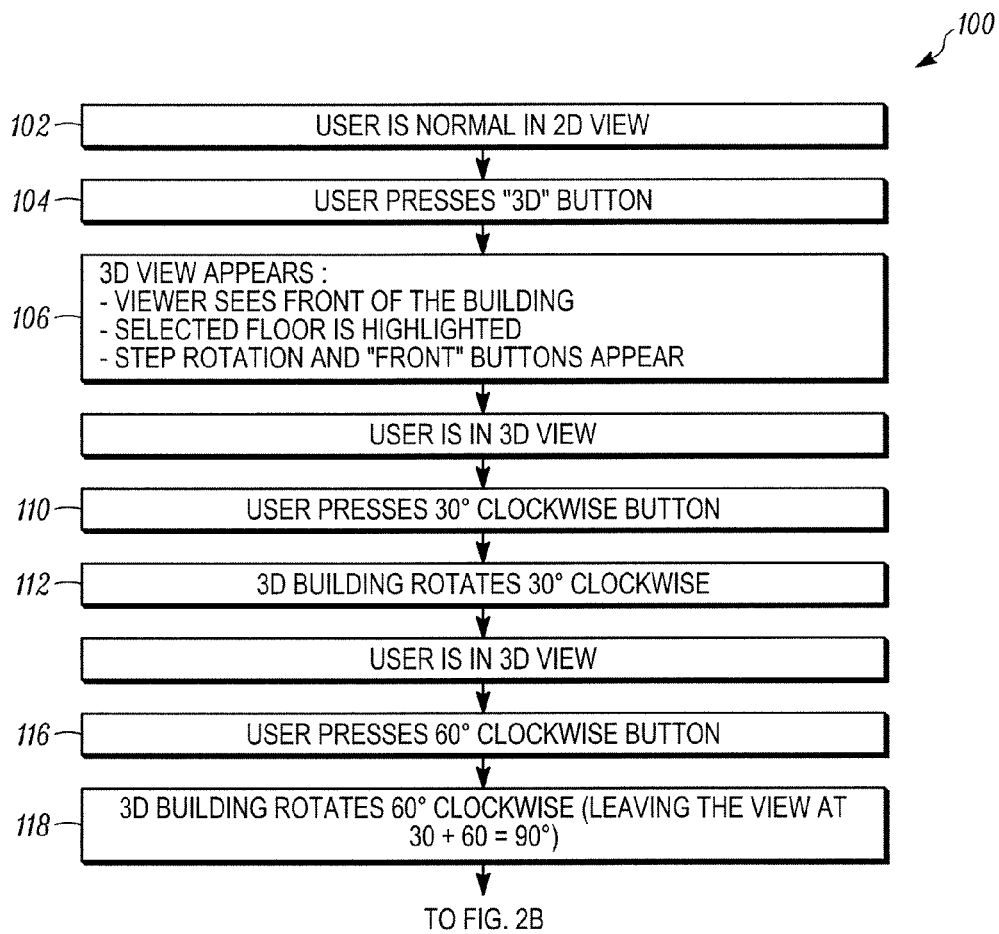
FIGS. 2A, B taken together are a flow diagram of a method in accordance with the invention.
Figure 2B:
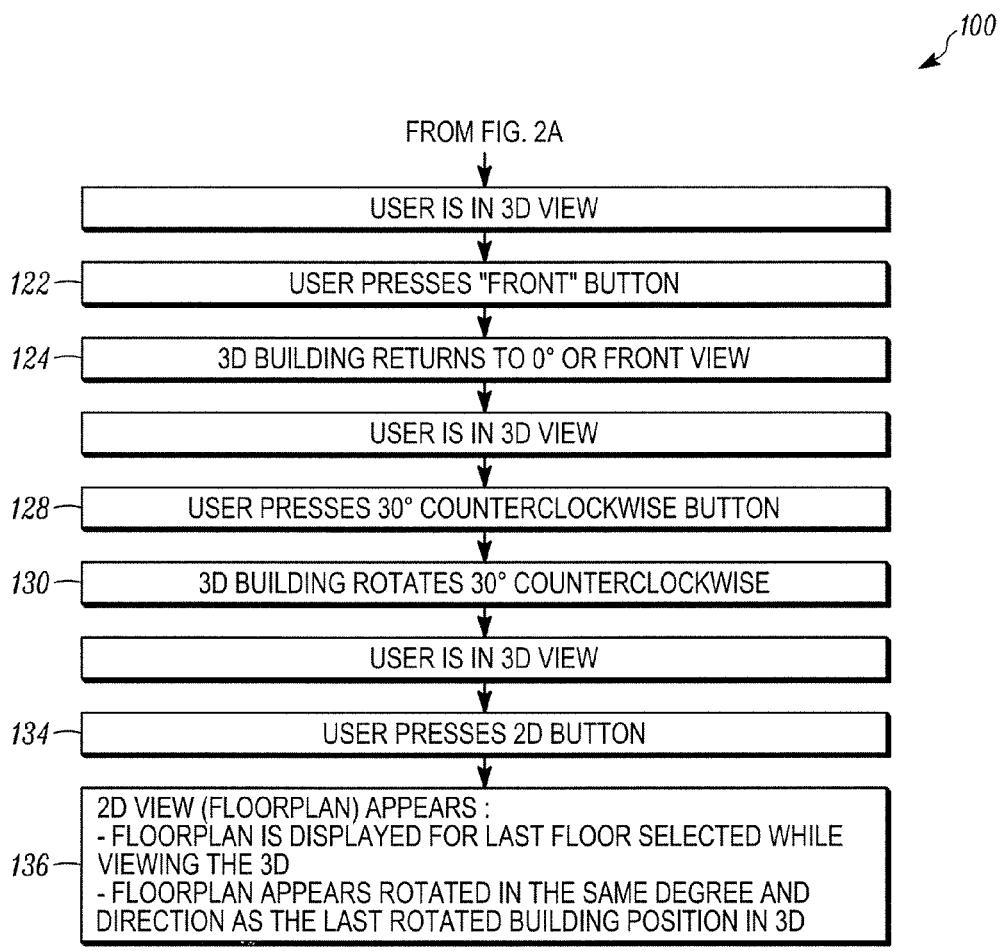
Figure 3:
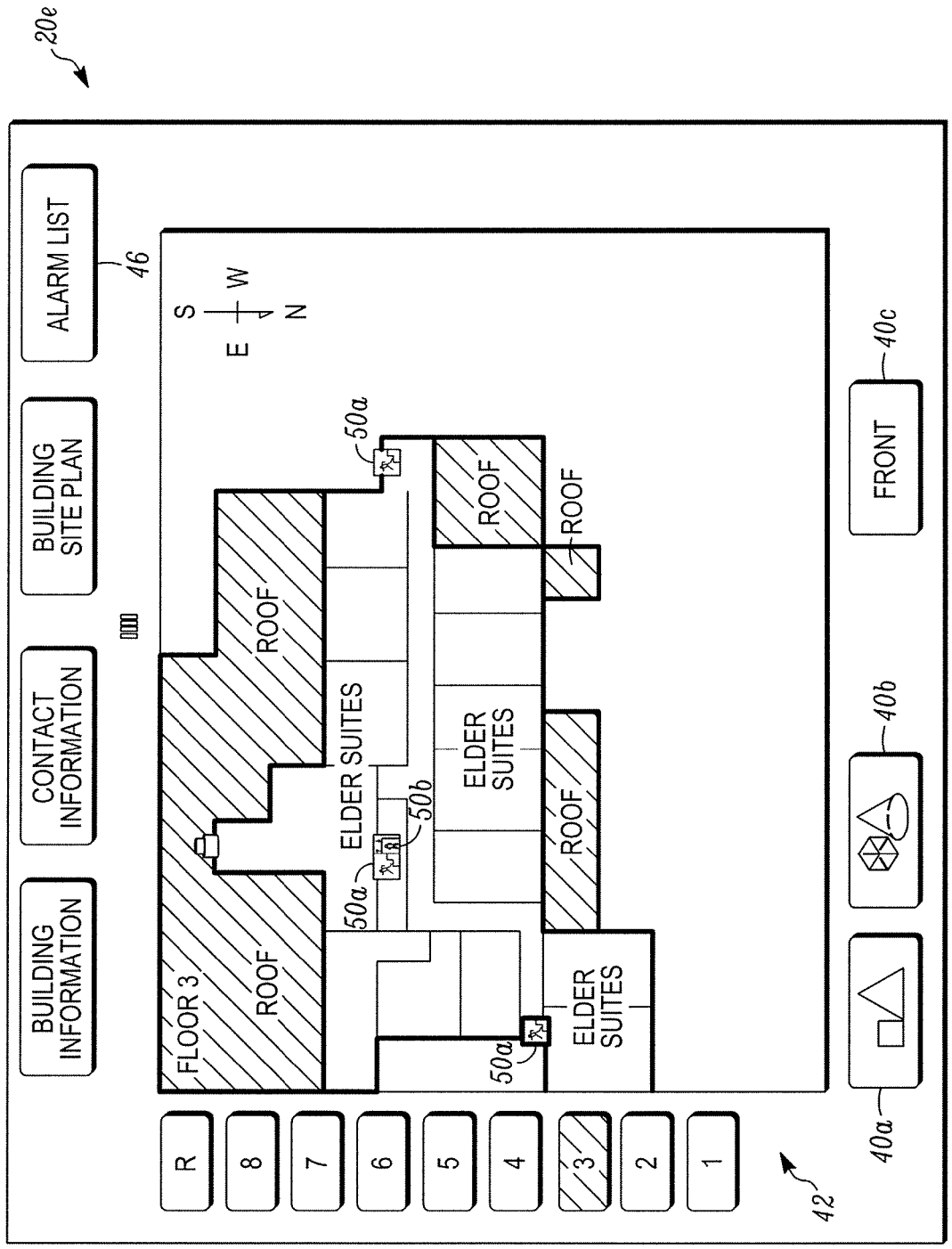
FIG. 3 is an image presented by the method of FIGS. 2A, B.

FIGS. 2A, 2B taken together illustrate a method 100 in accordance with the invention. In a step 102 a two dimensional plan view of a selected floor, see FIG. 3, is illustrated on a display 20e for the user. As illustrated in FIG. 3, two dimensional plan views are activated by control element or button 40a. Three dimensional views are activated by a control element or button 40b.

FIG. 3 illustrates a plan view of the third floor of the building B1 looking toward the front of the building as indicated by orientation indicator 40c. The floor to be displayed can be selected from a plurality of control elements or buttons indicated generally at 42.

An alarm list can be displayed via control element or button 46.

Figure 4:
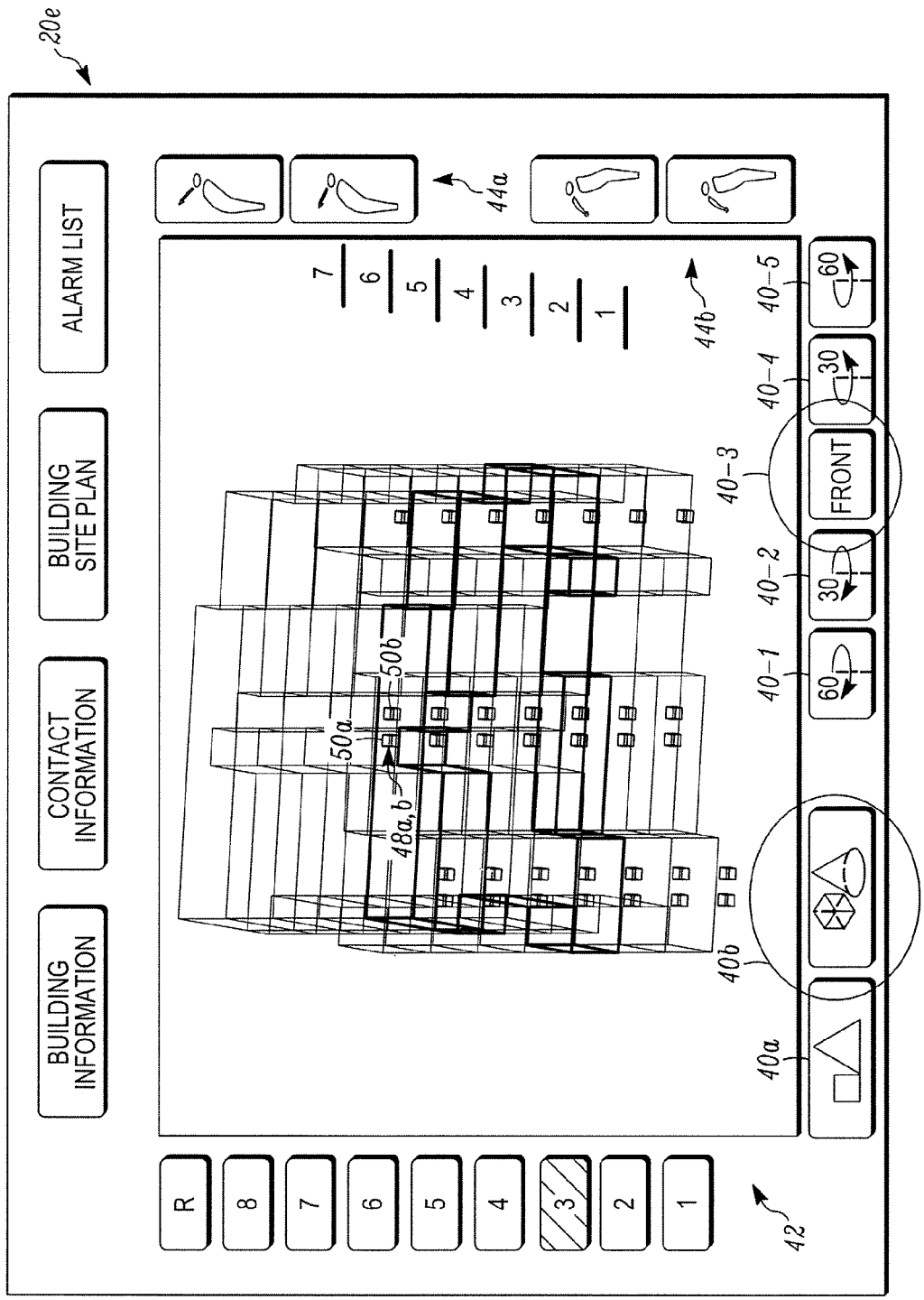
FIG. 4 illustrates another step of the method of FIGS. 2A, B.

In a step 104 the user can press the "3D" control element or button 40b. In response thereto, the software 20d displays a rendering of the building B1 indicated in FIG. 4, step 106. As illustrated in FIG. 4, the viewer or operator continues to see an image looking to the front of the building. Indicators 44a and 44b at the right side of the display of FIG. 4 can be used to change the viewing perspective or "pitch" of the view.

The floor selected from the plurality 42, namely floor 3, is emphasized in the display of FIG. 4. The display of FIG. 4 not only presents the configuration of the third floor, as well floors above and below that, but it displays location of a variety of detectors, alarm indicting devices, elevators, stairs and the like all without limitation.

Figure 5:
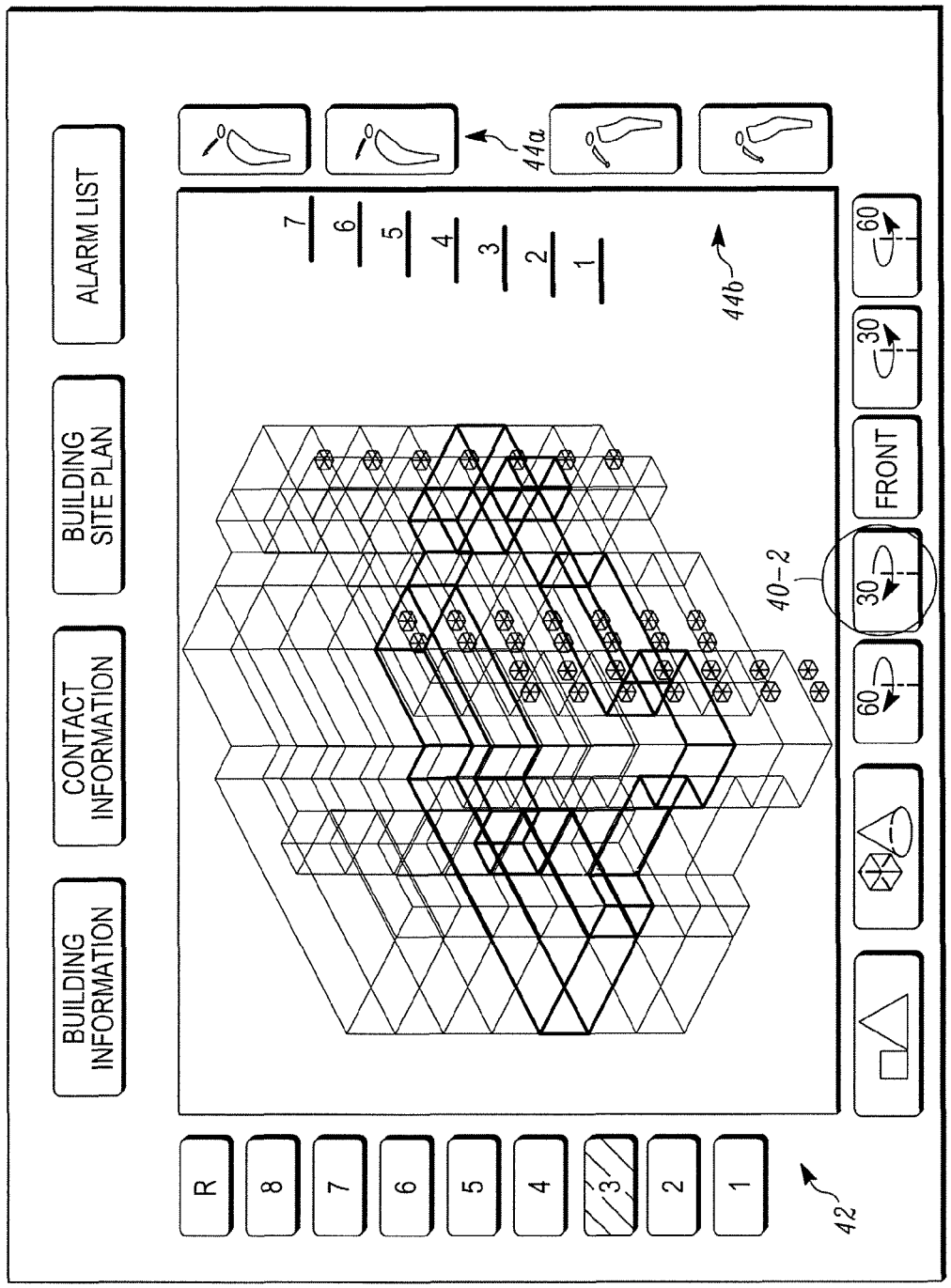
FIG. 5 illustrates a third step of the method of FIGS. 2A, B.

In addition to the display specifying buttons 40A, B the display of FIG. 4 also provides additional control buttons 40-1 . . . 40-5 which can be used to control the orientation and produce rotation of the image present on the display 20e. For example, if the user activates button 40-2, step 110, requesting 30 degree clockwise rotation, the rendering software 20d rotates the image of FIG. 4 30 degrees clockwise as illustrated in FIG. 5, step 112. The display of FIG. 5 presents the building B1 with the requested orientation while still carrying and showing the appropriate relative locations of the various detectors, alarm output devices, stairways, elevators and the like all without limitation.

Figure 6:
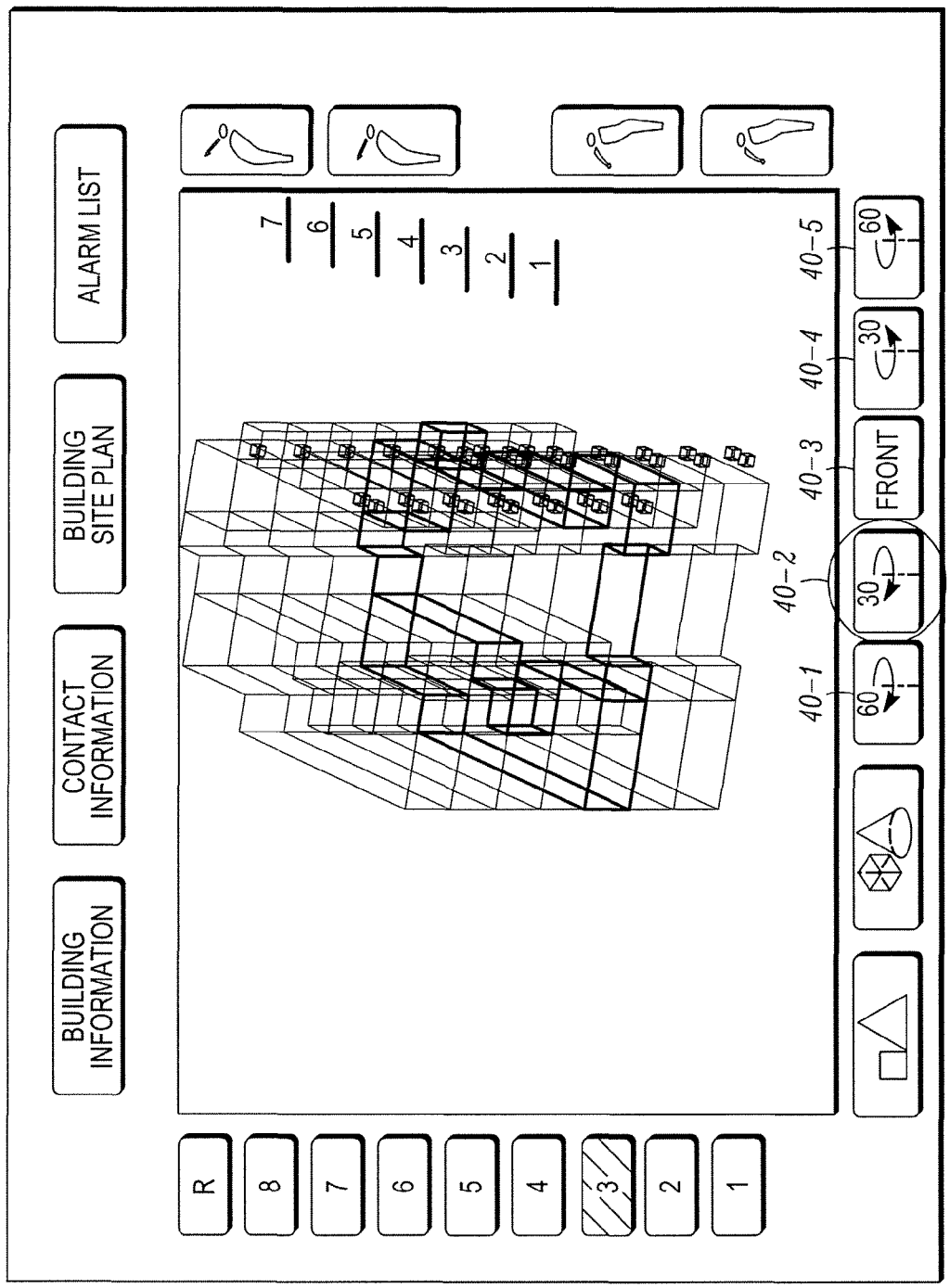
FIG. 6 illustrates another step of the method of FIGS. 2A, B.

FIG. 6 illustrates the image of the building B1 where the user has again activated the command or control button 40-2 requesting another 30 degree clockwise rotation which produces a total of 60 degrees of rotation relative to the front of the building. Alternately, instead of activating the button 40-2 twice, in step 116, the user activate control element or button 40-1 requesting a sixty degree clockwise rotation of the image which in addition to the previously provided 30 degree rotation results in a total of a ninety degree rotation relative to the front of the building step 118.

Figure 7:
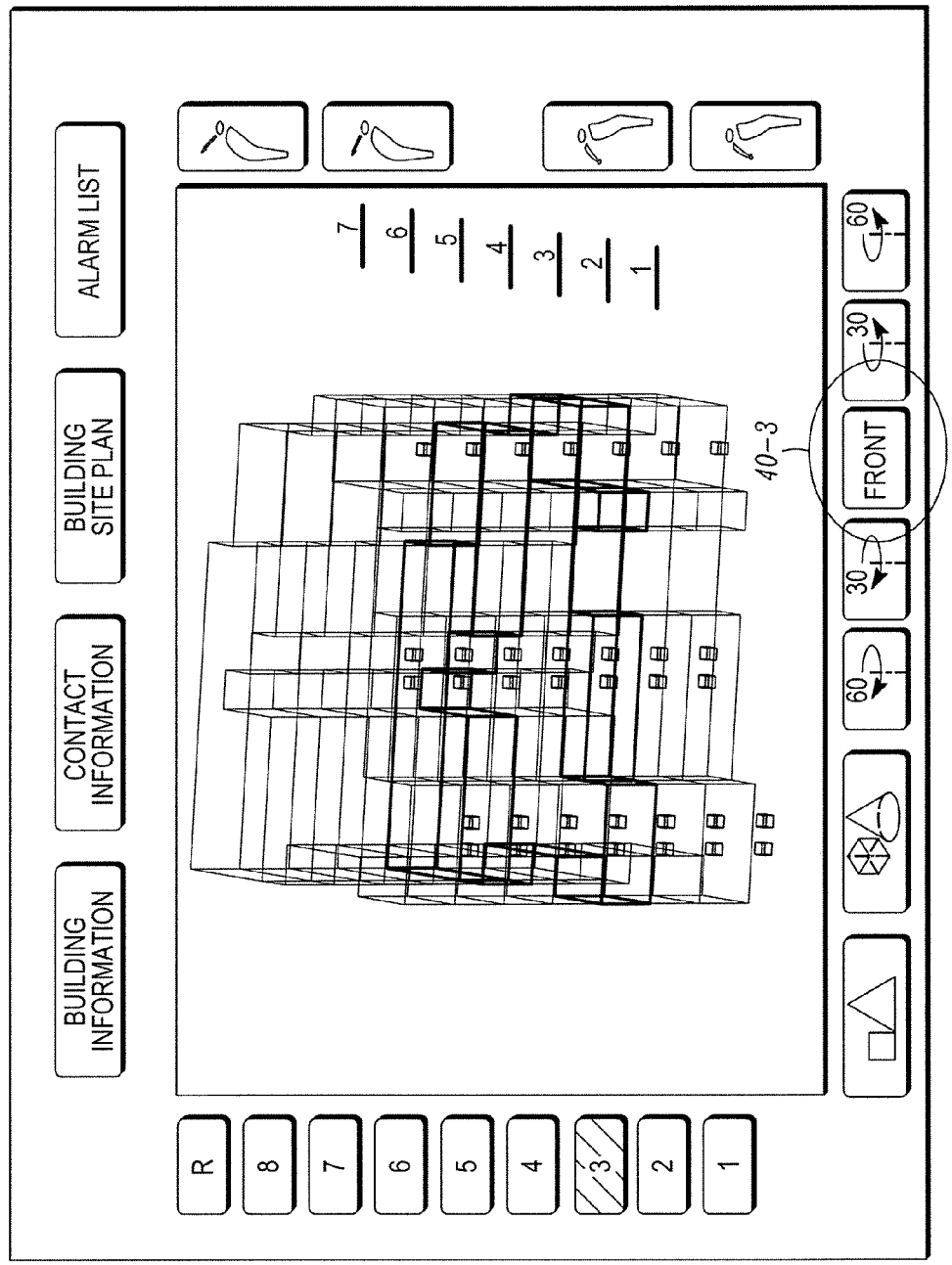
FIG. 7 illustrates yet another step of the method of FIGS. 2A, B.

In the event that the user activates the "front" control element or button 40-3, step 122, the image of the building B1 is rotated back to its original orientation with the user or operator viewing the image from the front of the building, see FIG. 7, step 124.

Figure 8:
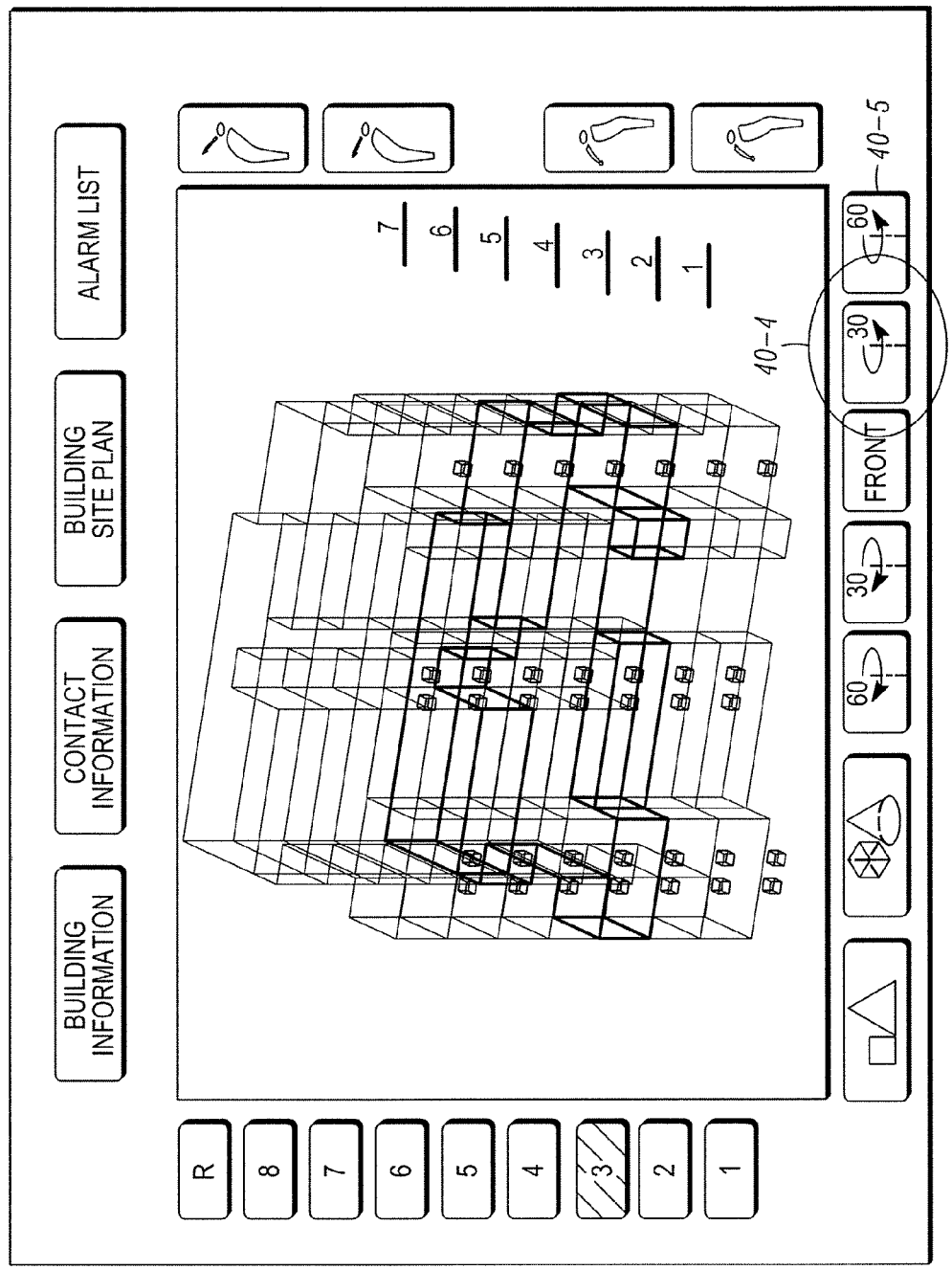
FIG. 8 illustrates yet another step of the method of FIGS. 2A, B.
Figure 9:
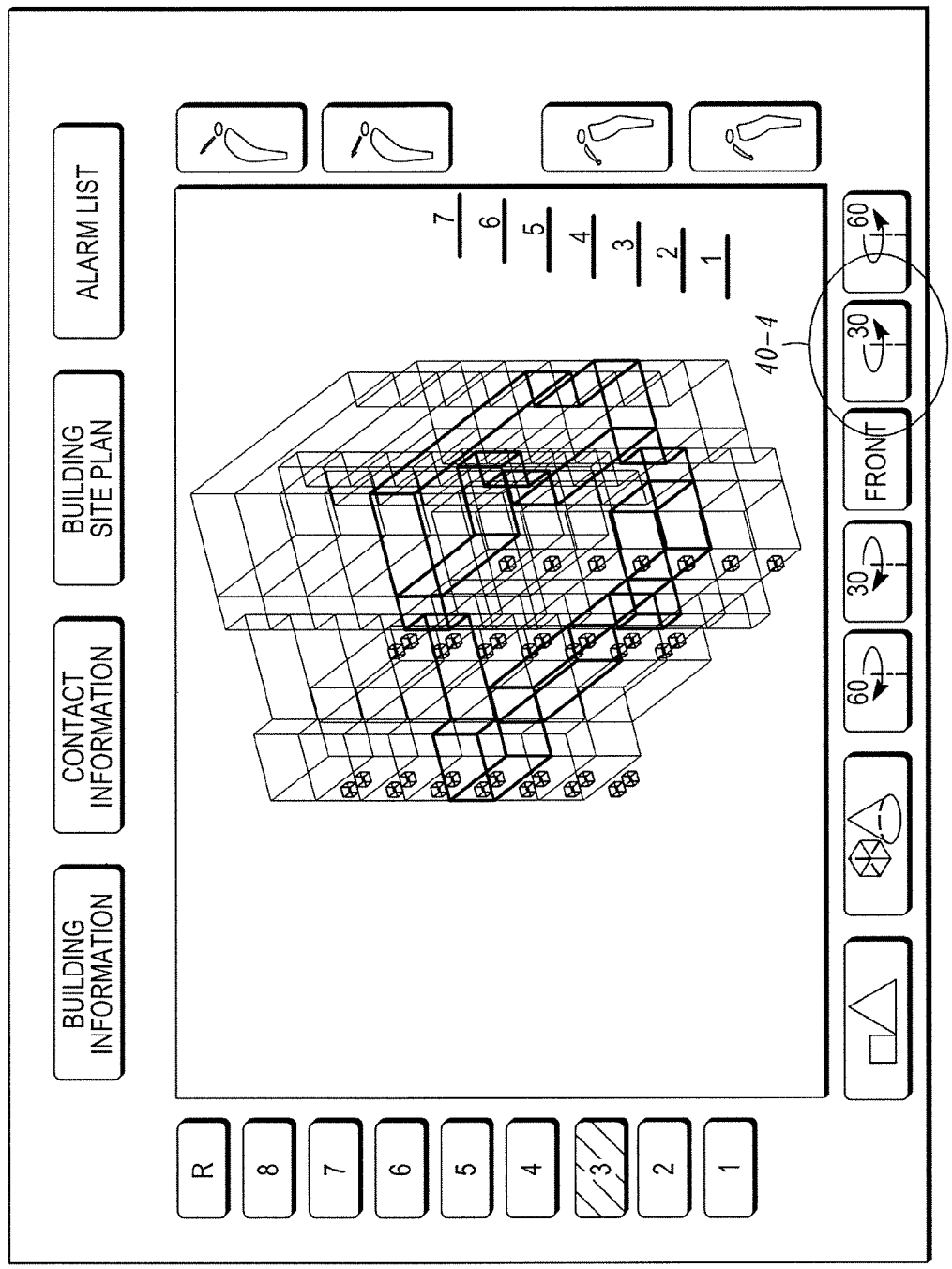
FIG. 9 illustrates yet another step of the method of FIGS. 2A, B.

As illustrated in FIG. 8, if the operator or user activates the control element or button 40-4, step 128, requesting a 30 degree counterclockwise rotation, the image of the building B1 is rotated accordingly, and as illustrated in FIG. 8, continues to display the various detectors, output devices, stairways or elevators for example, with the appropriate relative location, step 130. Similarly, if the user continues to activate the 30 degree counterclockwise rotation button or control element 40-4, see FIGS. 9, 10, the image of the building B1 presented on the display 20e will rotate counterclockwise with the requested 30 degree increments.

Figure 10:
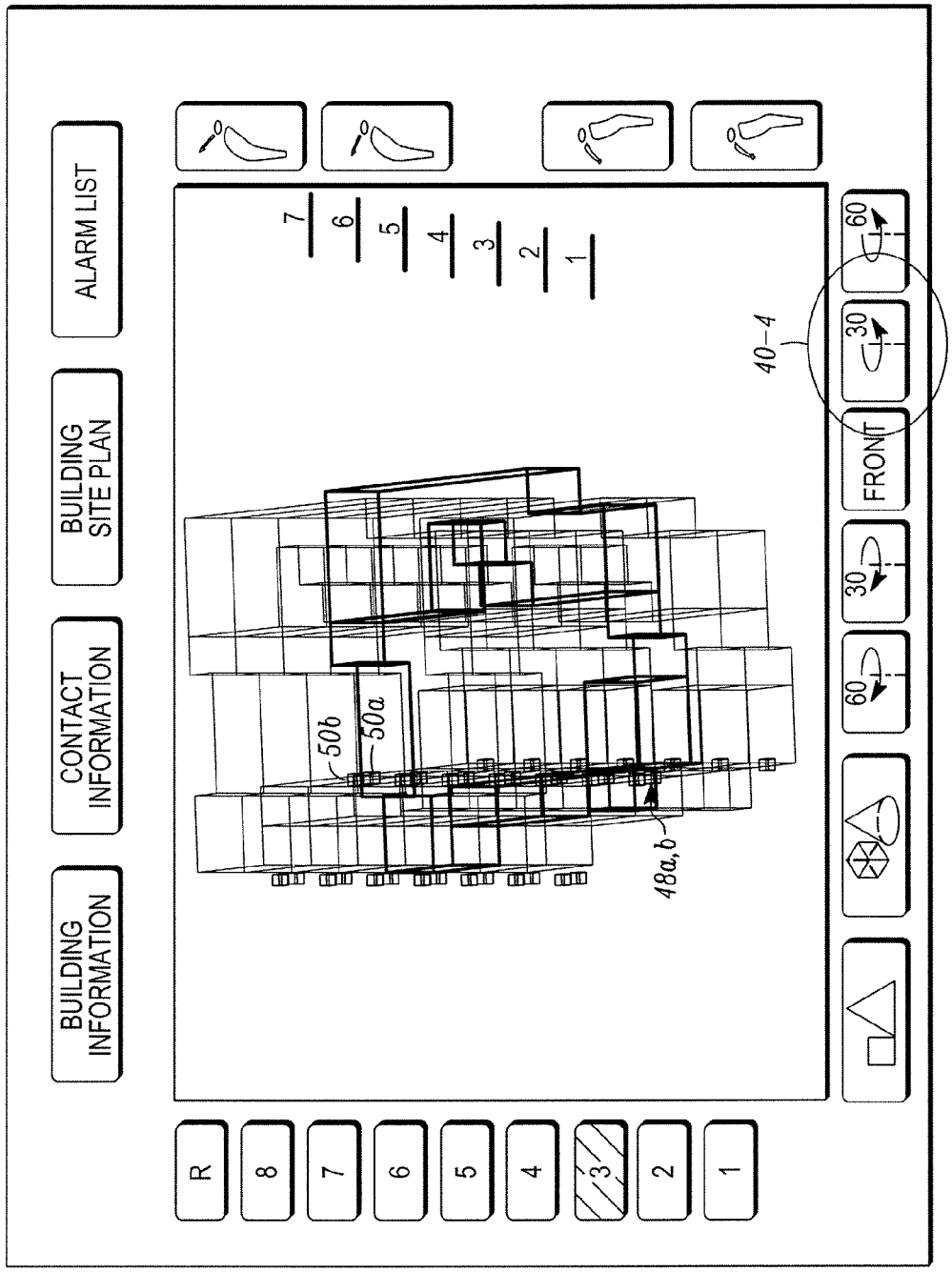
FIG. 10 illustrates yet another step of the method of FIGS. 2A, B.
Figure 11:
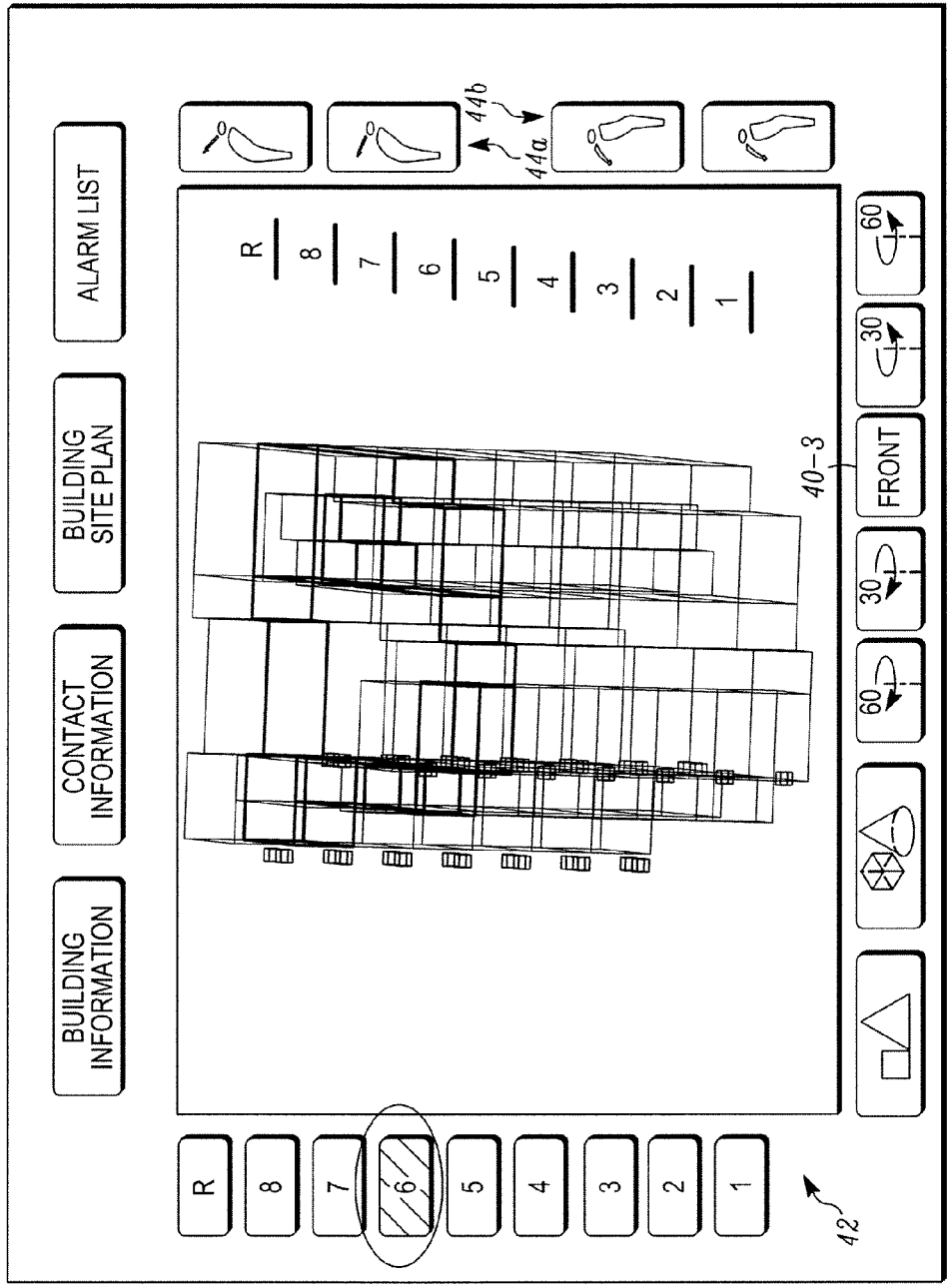
FIG. 11 illustrates yet another step of the method of FIGS. 2A, B.

In the event that the user desires to view the building B1 with the orientation at FIG. 10 but relative to a different floor, another floor can be selected from the plurality 42 and displayed as illustrated in FIG. 11. Finally, if the user selects or activates 2D display element or button 40a, the selective floor, floor 6, will be presented as a plan view, see FIG. 12, step 136 with the same orientation relative to the front of the building as previously presented in the last three dimensional view, FIG. 11.

Figure 12:
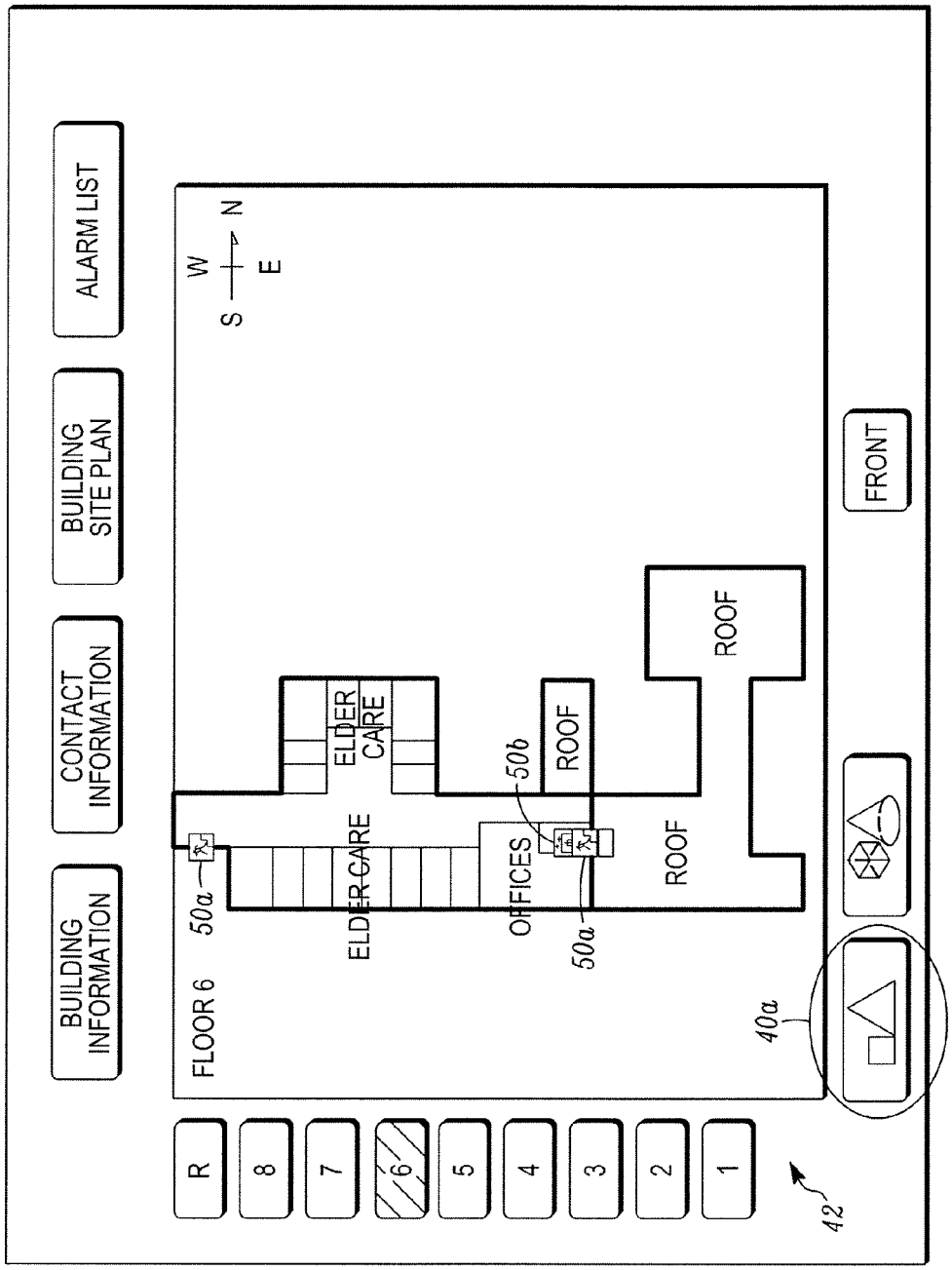
FIG. 12 illustrates yet another step of the method of FIGS. 2A, B.

As illustrated in FIG. 12, in the plan view the sixth floor includes the stair and elevator icons 50a,b and could include other icons such as detectors and alarm indicating output devices such as 48a,b with the proper orientation relative to floor 6 and also relative to the front of the building. It will also be understood that a variety of other symbols indicating other information of use or importance to first responders could also be incorporated into the displays of FIGS. 3-12 including the locations of sprinkler heads, and which sprinkler heads have become active, if known. Other information includes which of detectors such as 48a are indicting an alarm condition. Other indicators of temperature or air quality could also be included in the images of FIGS. 3-12 along with either color or numeric indicia indicative of the state of those particular detectors. All such variations come within the spirit and scope of the present invention.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

The invention claimed is:

1. A method comprising:
control circuits including a programmable processor acquiring information from within a database relative to a floor of a building to be rendered;
control circuits including the programmable processor presenting a floor on a display in response to acquired information;
control circuits including the programmable processor locating selected alarm indicating devices relative to the floor in response to acquired information in a multi-dimensional image on a display; and
control circuits including the programmable processor eliminating the need for continuous animation by rotating the image on the display in predetermined selectable increments while continuing to locate the selected alarm indicating devices in an appropriate location relative to the floor.

2. The method as in claim 1 which includes surrounding the floor and the objects with a plurality of walls.

3. The method as in claim 1 which includes establishing a building specifying database.

4. The method as in claim 3 where acquiring includes accessing the building specifying database.

5. The method as in claim 3 where acquiring includes accessing the building specifying database for multi-floor building information.

6. The method as in claim 2 which includes establishing another floor spaced from the floor element by the walls.

7. The method as in claim 2 which includes establishing a plurality of floor and wall combinations with each floor spaced apart from at least one other floor by an intervening wall.

8. The method as in claim 7 which includes establishing floor and wall combinations with at least some of the floors spaced apart from adjacent first and second floors by intervening walls.

9. The method as in claim 8 which includes providing graphical indicia as to states of at least some of the objects.

10. The method as in claim 8 which includes displaying fire detectors installed on respective of the rendered floors.

11. The method as in claim 10 which includes displaying indicia that identify activated fire detectors.

12. The method as in claim 1 which includes providing dynamic building information indicative of the status of at least some of the objects.

13. The method as in claim 12 which includes displaying indicators indicative of status of at least some of the objects.

14. The method as in claim 1 where locating includes displaying locations of ambient condition detectors on the floor.

15. A system comprising:
a first set of building characteristics;
first software executable by a processor that provides a representation of at least one selected floor of the building in response to building characteristics;
second software executable by a processor that locates alarm indicating devices from the first database, on the selected floor;
third software executable by a processor that establishes a representation of walls for the selected floor; and
fourth software executable by a processor eliminating the need for continuous animation that incrementally rotates a visual representation of the floor and walls by a predetermined incremental value while continuing to locate the selected alarm indicating devices in an appropriate location relative to the floor.

16. The system as in claim 15 which includes a second database of dynamic building characteristics the second data base stored on a computer readable medium.

17. The system as in claim 16 which includes additional software to incorporate status information from the second database into the representation of the selected floor.

18. The system as in claim 15 which includes a display device and further software to present the representation as a multi-dimensional image.

19. The system as in claim 18 where the fourth software rotates the representation in one or more increments responsive to user input.

20. The system as in claim 18 which includes software to activate objects presented on the display in response to environmental conditions.

21. The system as in claim 20 which includes displaying trend information relative to activated objects.

22. The system as in claim 18 wherein the software presents the representation as a multi-floor building.

23. The system as in claim 22 which includes a second database of dynamic building conditions the second database stored on a computer readable medium.

24. The system as in claim 23 which includes presenting animated objects on respective floors of the building.

25. A system comprising:
a plurality of ambient condition detectors;
control circuitry in communication with the detectors, including first software executable by a processor that, at least in part establishes the presence of an alarm condition in a region being monitored by at least some of the detectors;
second software executable by a processor for visually presenting a representation of at least a portion of the region being monitored;
the representation having a first formed floor element, secondly formed objects located relative to the floor element and a subsequently formed wall element that bounds the floor element at least in part; and third software for discontinuously rotating the representation by a predetermined rotational value while locating the alarm condition of the at least some detectors in an appropriate location relative to the floor.

26. The system as in claim 25 where some of the objects correspond to respective ones of the ambient condition detectors and which includes software to provide visual indicia of status of detectors indicating a local alarm condition located adjacent to a portion of the floor element.

27. The system as in claim 25 where the second software visually presents a plurality of floor elements spaced apart by respective later formed wall elements.

28. The system as in claim 27 which includes fourth software to enlarge and reduce at least portions of the plurality.

29. The system as in claim 28 which includes a database, recorded on a computer readable memory, of variable environmental conditions associated with at least some of the detectors.

30. The system as in claim 29 where at least some of the detectors are selected from a class which includes thermal detectors, gas detectors, smoke detectors, water-flow detectors, motion detectors and position detectors.

31. The system as in claim 25 where the second software retrieves a pre-stored form of the representation prior to presenting it.

32. The system as in claim 31 which includes software that associates a status indicator with at least some of the objects.

33. An apparatus comprising:

a multi-dimensional, visual display device;

first software executable by a processor, for representing a plurality of floors of a building and presenting an image of the floors on the display along with a plurality of operator selectable command regions;

at least some alarm indicating devices located on at least some of the floors; and second software, executable by the processor, responsive to at least one of the command regions that selects a two dimensional or a three dimensional image of at least some of the plurality of floors of the building while continuing to locate the selected alarm indicating devices in an appropriate location relative to the floor.

34. The apparatus as in claim 33 which includes third software, responsive to another of the command regions, which rotates a selected image of the building an increment in a selected direction.

35. The apparatus as in claim 34 where the third software rotates the selected images in first and second different directions.

36. The apparatus as in claim 34 which includes additional software, responsive to a selected command region, which displays a selected floor of a multi-floor image in accordance with a first visual characteristic different from a second visual characteristic of a display of other floors.

37. The apparatus as in claim 33 which includes software, responsive to a selected command region which when activated, always presents an image of the building with respect to a predetermined reference location.

38. The apparatus as in claim 33 where the second software presents the selected image with a common orientation and floor relative to an immediate prior image.

* * * * *